Patented Apr. 16, 1946

2,398,685

UNITED STATES PATENT OFFICE 2,398,685

PRODUCTION OF ACYCLIC KETONES

Harry Louis Yale and George W. Hearne, Berkeley, Calif., assignors to Shell Development Company, San Francisco, Calif., a corporation of Delaware No Drawing. Application January 29, 1944, Serial No. 520,340

12 Claims. (Cl. 260—597)

This invention relates to the production of acyclic ketones from olefins. More particularly, the invention relates to a method for preparing acyclic ketones which comprises reacting a non-tertiary olefin containing more than three carbon atoms with an oxygen-containing mercuric salt.

It has been found that non-tertiary acyclic olefins having more than three carbon atoms may be converted economically and in good yields to ketones, including the hitherto relatively unavailable vinyl-type ketones

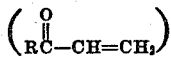

$$\left( R\overset{O}{\overset{\|}{C}} - CH=CH_2 \right)$$

which are useful as solvents and in a wide variety of other industrial applications, by oxidizing the said olefins by treatment with an oxygen-containing mercuric salt. The nature of the reaction which occurs is dependent upon the type of olefin employed as a starting material. When an alpha-olefin of the type described is reacted with an oxygen-containing mercuric salt, the olefin is converted to the vinyl-type ketone of corresponding structure. However, when an olefin is used in which the carbon-carbon double bond does not involve a terminal carbon atom, as in a beta-olefin, a saturated ketone is produced. These reactions may be represented by the following equations in which alpha-butylene and beta-butylene are used as representative olefins:

$CH_3CH_2CH=CH_2+4HgSO_4+H_2O \longrightarrow$

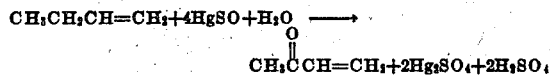

$CH_3\overset{O}{\overset{\|}{C}}CH=CH_2+2Hg_2SO_4+2H_2SO_4$ and $CH_3CH=CHCH_3+2HgSO_4+H_2O \longrightarrow$

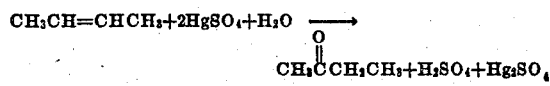

$CH_3\overset{O}{\overset{\|}{C}}CH_2CH_3+H_2SO_4+Hg_2SO_4$

Although the above represent the net reactions occurring when a normal butylene is treated with a reagent comprising mercuric sulfate and water under suitable conditions of operation, it appears that the reaction occurs in two steps, in the first of which the mercuric sulfate reacts with the butylene to form a butylene-mercuric sulfate complex. This complex is then broken down under the conditions of the reaction to form a ketone, sulfuric acid and mercurous sulfate. In the case of beta-butylene, the reactions for these steps may be represented as follows:

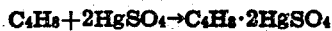
$C_4H_8+2HgSO_4 \rightarrow C_4H_8 \cdot 2HgSO_4$
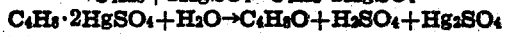
$C_4H_8 \cdot 2HgSO_4+H_2O \rightarrow C_4H_8O+H_2SO_4+Hg_2SO_4$ It is therefore possible to carry out the process of the invention as either a single-stage or a two-stage operation. In the single-stage mode of operation, the olefin may be reacted with the oxygen-containing mercuric salt under conditions such that the olefin-mercuric salt complex is decomposed to form a ketone and a mercurous salt substantially as soon as it is formed. This may be accomplished, for example, by carrying out the reaction at a temperature which is at or above the decomposition temperature of the said olefin-mercuric salt complex. In this embodiment of the invention a quantity of olefin may be passed into or contacted with a solution of an oxygen-containing mercuric salt contained in a suitable reaction chamber at a temperature which is approximately the boiling or reflux temperature of the said solution, the ketone product being separated by suitable means from the gases leaving the said reaction chamber. Better yields and a superior product are obtained in most cases, however, when the process is carried out in two stages. When employing the two-stage mode of operation, a quantity of olefin or of olefin-containing gas may be contacted with a neutral or acid solution of an oxygen-containing mercuric compound contained in a suitable reaction vessel, the temperature being maintained at a level which is substantially below the decomposition temperature of the olefin-mercuric compound complex. When the desired amount of the said oxygen-containing mercuric compound has been converted to the complex, an oxygen-containing acid may be added, if desired, and the temperature of the reaction mixture raised to a temperature which is above the decomposition temperature of the complex, thereby effecting its decomposition and forming a ketone and a quantity of an oxygen-containing mercurous compound. The ketone product may then be separated from the reaction mixture by any desired means, as by distillation.

The above-described procedure may be carried out in a batch, intermittent or continuous manner. When a batch operation is desired the olefin may be added to the oxygen-containing mercuric compound contained in a suitable reaction vessel in substantially the same fashion as described above. When operating as a continuous process, however, a stream of olefin or of olefin-containing gas may be continuously passed concurrently or countercurrently to a stream of the oxygen-containing-mercuric-salt reagent in a suitable reaction chamber or absorption tower. In single-stage operation the reaction may be carried out in the presence of an oxygen-containing acid and at a temperature which is sufficiently high to effect the decomposition of the olefin-mercuric salt complex substantially as soon as it is formed. The ketone product may then be continuously withdrawn from the reactor and purified by distillation, while the mercurous compound which is formed together with the ketone by the decomposition of the said complex may be continuously withdrawn as a sludge, separated from the acid, decomposition products, etc., with which it may be contaminated and reconverted by suitable means to the oxygen-containing mercuric compound which is used as a starting material. The mercuric compound as well as any unreacted olefin which may be recovered from the reaction chamber may be added to the fresh feed and recycled.

When carrying out the reaction continuously in two stages, the olefin may be continuously contacted with the mercuric salt-containing reagent at a temperature at which the olefin-mercuric salt complex is stable. This step may be carried out with or without the addition of oxygen-containing acid. The mixture containing the olefin-mercuric salt complex may then be passed continuously into a second reactor where an acid may be added, if desired, and the decomposition of the complex effected by heating the mixture to a temperature which is equal to or greater than the decomposition temperature of the said complex. The resulting ketone and mercurous-salt-containing sludge may be separately withdrawn from the reaction chamber and recovered as indicated hereinabove.

A preferred method of executing the process of the invention may be illustrated by that which may be employed in oxidizing beta-butylene to methyl ethyl ketone. In accordance with this manner of operation a stream of beta-butylene may be contacted with a mixture of aqueous sulfuric acid and mercuric sulfate at a temperature of about 20° C. to about 70° C., but preferably between about 50° C. and about 60° C. and at such a rate that the beta-butylene is substantially completely absorbed. When the mercuric sulfate content of the solution has been substantially completely converted to the beta-butylene-mercuric sulfate complex, as indicated by the characteristic color change of the solution and by the failure of the solution to absorb further quantities of beta-butylene, the temperature of the reaction mixture is increased to about 100° C., thereby effecting the decomposition of the olefin-mercuric sulfate complex and forming methyl ethyl ketone and mercurous sulfate. The methyl ethyl ketone may then be separated from the mixture by any suitable means, as by distillation.

The process of the invention may be applied with suitable modifications to the oxidation of a wide variety of olefins. Suitable olefins are in general non-tertiary acyclic olefins having more than there carbon atoms. Representative olefins which may be converted to the corresponding ketones by the process of the invention are, for example, alpha-butylene (butene-1), beta-butylene (butene-2), pentene-1, pentene-2, hexene-1, hexene-2, hexene-3, 4-methyl-pentene-1, 4-methyl-pentene-2, 3-methyl-butene-1, 3-methyl-pentene-1, 4-methyl-hexene-1, 4-ethyl-hexene-1, 4-methyl hexene-2, 4-ethyl-hexene-2, 3-methyl-hexene-1, 3-ethyl-hexene-1, 5-methyl-hexene-1, 5-methyl-hexene-2, 5-methyl-hexene-3, the non-tertiary heptenes, the non-tertiary octenes, the non-tertiary nonenes and decenes, butadiene, the pentadienes, the hexadienes, the heptadienes and the like. These compounds may be substituted with non-interfering substituent groups such as the ether, halogen, hydroxyl, carbonyl and ester groups. The olefins may be used singly or in combination with each other. They may be used as pure onefins or in admixture with non-interfering substances, e. g. the paraffin hydrocarbons, nitrogen, etc. The process is thus adapted to the utilization of commercial olefin fractions containing in addition to olefins substantial amounts of paraffin hydrocarbons and, in some cases, nitrogen.

The structure of the product formed is dependent upon the nature of the olefin used. In general alpha-type olefins (RCH$_2$CH=CH$_2$) yield vinyl ketones

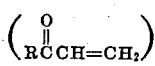

together with small amounts of saturated diketones

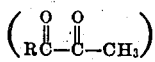

while other non-tertiary olefins yield either one or both of two ketones of isomeric structure depending upon the operating conditions. Thus, an olefin having the structure RCH=CHCH$_3$ when treated with a mercuric salt in accordance with the process of the present invention may yield either

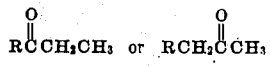

or a mixture of these two isomers.

A variety of mercuric salts may be used in executing the process of the present invention. Suitable salts comprise in general the mercuric salts of the oxygen-containing acids such as sulfuric acid, acetic acid, nitric acid, phosphoric acid and the like. Mercuric sulfate represents a preferred member of this group, although mercuric nitrate, mercuric phosphate, mercuric acetate, mercuric formate, mercuric propionate, mercuric chloro acetate, etc., may also be used. These salts may be used singly or in combination with each other. If desired, they may be prepared in situ by adding an acid to an appropriate mercuric salt such as mercuric oxide or mercuric carbonate, thereby converting the said compound to the desired salt. The amount of mercuric salt to be used is dependent upon the amount of olefin which it is desired to convert to the corresponding ketone. In general, it is preferable to use an amount of mercuric salt which represents an excess of from about 25% to about 50% over that theoretically required to combine with the olefin. As indicated hereinabove, the mercuric salt is converted during the course of the reaction to the corresponding mercurous salt which is recovered as a sludge from the reaction mixture. The mercurous salt content of the said sludge may be converted to the mercuric salt by any one of several methods known heretofore to the prior art. The mercurous salt may be converted to the corresponding mercuric salt, for example, by electrolytic oxidation, by heating with nitric acid, by treating with chlorine gas in the presence of acid, etc. The re-oxidized mercuric salt may then be used to convert a fresh quantity of olefin to ketone.

Although as indicated hereinabove the process of the invention may usually be executed without the addition of an acid to the reaction mixture, it may be desirable in some cases to carry out the reactions, particularly the decomposition of the olefin-mercuric salt addition compound, in a reaction medium to which an acid has been added. If an acid is used, it should be an oxygen-containing acid of sufficient strength to prevent the hydrolysis of the mercuric salt and to effect the decomposition of the olefin-mercuric salt complex under the conditions of the reaction. Suitable acids are the relatively strong oxygen-containing mineral acids such as sulfuric, nitric, or phosphoric acid or, in general, any organic or inorganic oxygen-containing acid of sufficient strength to result in the formation of a reaction medium having a pH of less than about 4. Such acids include acetic acid, bromacetic acid, butyric acid, chloracetic acid, citric acid, formic acid, isobutyric acid, oxalic acid, phosphoric acid, phosphorous acid, propionic acid, sulfanilic acid, sulfurous acid, valeric acid and the like. These acids may be used singly or in combination with each other and may or may not correspond to the mercuric salt used. The acid may, if desired, be introduced as the acid anhydride and converted to the corresponding acid by reacting it with the water content of the mixture. In many cases, sulfuric acid in a concentration of from about 0.1% to about 25.0%, preferably about 0.25% to about 5.0% represents a particularly desirable acid medium in which to carry out the process of the invention.

It is generally preferred to carry out the reaction in aqueous medium. However, if desirable or necessary because of the nature of the reactants used a mutual solvent, e. g. acetone, may be added to promote the solution or absorption of the olefin in the reaction mixture. Suitable solvents are those which will not cause deleterious side reactions to take place and which may be readily separated from the reaction products.

The temperature at which the process is carried out is variable depending upon the nature of the reactants, and upon whether the process is carried out in one or two stages. If carried out as a single-stage process, i. e. one in which the olefin-mercuric salt complex is decomposed substantially as soon as formed, the temperature employed may advantageously be a temperature which is approximately the boiling temperature of the reaction mixture. Where the reaction is carried out in aqueous medium at atmospheric pressure, this temperature will be about 100° C. Where, however, the process is carried out in two stages, the temperature of operation of the first stage, i. e. that stage in which the olefin is reacted with the mercuric salt to form an olefin-mercuric salt complex, should be substantially below the decomposition temperature of the said complex. With most olefins a temperature range of between about 20° C. and about 70° C., preferably between about 50° C. and about 60° C., represents a suitable temperature range. After the conversion of the olefin to the olefin-mercuric salt complex is substantially complete, the temperature may be raised in the second stage of the process to a level at which the said complex is unstable and decomposes to form the desired ketone together with a quantity of mercurous salt. This is in general a temperature of between about 90° C. and about 105° C., preferably a temperature which is approximately equal to the reflux or boiling temperature of the reaction mixture, e. g. a temperature of about 100° C., when the reaction is carried out in aqueous medium.

The process of the invention may usually be effectively executed at atmospheric pressure. If desired, however, subatmospheric or superatmospheric pressures may be employed. Operating at elevated pressures, i. e. pressures of between about 50 lbs. per sq. in. and about 300 lbs. per sq. in., may be advantageous in some instances, as where it is desired to effect the complete and rapid absorption in the mercuric salt reagent of a particular olefin which is in the gaseous state at the temperature of reaction.

The process may be carried out in any suitable type of apparatus which is adapted to batch or continuous one-stage or two-stage operation and which is provided with suitable means for maintaining the reaction mixture at the desired temperature level. The equipment should be of such a nature as to effect intimate contact between the olefin and the mercuric salt reagent. This may be accomplished in batch operation by bubbling a quantity of the gaseous olefin through the said reagent and in continuous operation by passing a stream of the olefin concurrently or countercurrently to a stream of the said mercuric salt reagent in a suitable absorption tower.

The ketone product may be separated from the reaction mixture in any desired manner as by distilling it together with relatively small amounts of water or solvent and subsequently separating the desired ketone from the contaminating materials by any suitable means as by fractional distillation, salting out, etc. The mercurous salt, which is usually contaminated with small amounts of free mercury, may be withdrawn as a sludge from the reaction vessel. The mercurous salt may then be converted to the desired mercuric salt as indicated hereinabove.

The process of the invention is illustrated by the following examples, wherein the amounts of the reactants are given in parts by weight.

*Example I*

A stream of beta-butylene (butene-2) was passed into a stirred suspension comprising about 5 parts of mercuric sulfate and about 22 parts of a 1.8% aqueous solution of sulfuric acid at such a rate that the absorption of the beta-butylene was substantially complete, the temperature being maintained at about 55° C. As the gas was absorbed, the original yellow color of the suspension slowly changed to white. When the suspension had become uniformly white in color, the temperature was slowly raised to 100° C. Decomposition of the beta-butylene-mercuric sulfate complex occurred at this temperature and the methyl ethyl ketone distilled out of the reaction mixture as the water-methyl ethyl ketone azeotrope. Addition of salt to this distillate resulted in the separation of the methyl ethyl ketone product.

*Example II*

A quantity of beta-butylene was reacted with a mixture comprising about 1 part of mercuric acetate and about 4 parts of a 2.34% aqueous solution of acetic acid substantially as described in Example I. Distillation of the reaction product resulted in the separation of methyl ethyl ketone together with a small amount of acetaldehyde.

*Example III*

Beta-butylene was reacted with a sulfuric acid solution of mercuric acetate using the procedure described in Example I. The product, i. e. the methyl ethyl ketone, was distilled from the reaction mixture as the water-methyl ethyl ketone azeotrope.

Example IV

Beta-butylene was reacted with an aqueous nitric acid solution of mercuric nitrate substantially in the manner described in Example I. The reaction in this case gave approximately equal amounts of methyl ethyl ketone and diacetyl together with a small amount of acetaldehyde.

Example V

Pentene-2 was reacted with an aqueous sulfuric acid solution of mercuric sulfate in the manner described in Example I. In this case a mixture of methyl-n-propyl ketone and di-ethyl ketone was separated from the product distilling from the reaction vessel.

Example VI

Butadiene was reacted with an aqueous sulfuric acid solution of mercuric sulfate as described in Example I to give methyl vinyl ketone together with small amounts of diacetyl as reaction products.

Example VII

A mixture of about 14 parts of hexene-1 and about 65 parts of a 1.74% aqueous solution of sulfuric acid was heated to a temperature of about 55° C. until the formation of the hexene-1-mercuric sulfate addition product was substantially complete. Decomposition of the addition product at 100° C. resulted in the separation of propyl vinyl ketone together with a small amount of acetyl butyryl.

Example VIII

Oxidation of octene-1 under conditions similar to those described in Example VII resulted in the recovery of pentyl vinyl ketone and acetyl hexoyl.

Example IX

Butene-1 was passed into a sulfuric acid solution of mercuric sulfate maintained at a temperature of about 55° C. until the absorption of the butene and the formation of the butene-mercuric sulfate addition compound were substantially complete. The temperature of the reaction mixture was then raised to about 100° C. in order to decompose the addition compound and form methyl vinyl ketone.

Example X

A stream of beta-butylene was passed into a mixture comprising about four parts of water and one part of mercuric acetate, no added acid being present. When absorption of the beta-butylene was complete, the temperature of the mixture was increased to 100° C., thereby hydrolyzing the beta-butylene-mercuric acetate complex. Methyl ethyl ketone was separated as a product from the reaction mixture.

We claim as our invention:

1. A process for the production of methyl ethyl ketone from butene-2 which comprises reacting at a temperature of between about 50° C. and about 60° C. the said butene-2 with mercuric acetate in an acid medium which contains between about 0.5% and about 5.0% of sulfuric acid thereby forming an addition product between the said butene-2 and the mercuric compounds present in the said acid medium, and subsequently raising the temperature of the said acid medium to a temperature which is approximately its boiling temperature in order to effect the decomposition of the said complex and the formation of methyl ethyl ketone.

2. A process for oxidizing butene-2 to methyl ethyl ketone which comprises forming an intermediate mercury-containing compound by reacting the said butene-2 at a temperature of between about 50° C. and about 60° C. with mercuric sulfate in an aqueous acid medium containing from about 0.5% to about 5.0% of sulfuric acid and subsequently heating the acid mixture containing the said complex to a temperature of about 100° C., thereby effecting its decomposition and forming the desired methyl ethyl ketone.

3. A process for the production of methyl ethyl ketone which comprises contacting at a temperature of between about 40° C. and about 70° C. beta-butylene with a quantity of a reagent comprising mercuric sulfate and dilute sulfuric acid containing between about 0.5% and 5.0% of sulfuric acid thereby forming a butylene-mercuric sulfate addition compound, and subsequently heating the said addition compound in an acid medium at a temperature sufficiently high to effect the decomposition of the said addition compound and the formation of the desired methyl ethyl ketone.

4. A process for the production of methyl vinyl ketone which comprises forming a butylene-mercuric sulfate complex by contacting alpha-butylene with a quantity of mercuric sulfate in an aqueous acid medium containing from about 0.5% to about 5.0% of sulfuric acid at a temperature of between about 50° C. and about 60° C., subsequently decomposing the said complex and forming the desired ketone by heating the said complex in the said aqueous acid medium at a temperature which is substantially equal to the boiling temperature of the latter.

5. A process for the production of methyl vinyl ketone which comprises reacting butene-1 at a temperature of between about 40° C. and about 70° C. with a mixture of mercuric sulfate and dilute sulfuric acid containing from about 0.5% and 5.0% of sulfuric acid, thereby forming a butene-mercuric sulfate addition product, and subsequently heating the said addition product in the said acid solution to a temperature of about 100° C. in order to decompose the said addition product and form the desired methyl vinyl ketone.

6. A process for the production of methyl vinyl ketone which comprises oxidizing beta-butylene with a mixture comprising an oxygen-containing mercuric salt and an acid solution having a sulfuric acid content of from about 0.5% to 5.0%.

7. A process for the production of methyl vinyl ketone from alpha-butylene which comprises contacting the said alpha-butylene at a reaction temperature with an oxidizing mixture comprising an oxygen-containing mercuric salt in a solution of sulfuric acid having a sulfuric acid content of from about 0.5% to 5.0%.

8. A process for preparing acyclic monoketones from a normal butylene which comprises reacting the butylene at a reaction temperature with an oxygen-containing mercuric salt in an aqueous solution of sulfuric acid having a sulfuric acid concentration of from 0.5% to 5%.

9. A process for producing acyclic monoketones which comprises oxidizing an acyclic olefine having more than three carbon atoms and containing only one unsaturated linkage consisting of a double bond between two carbon atoms each having at least one hydrogen atom directly attached thereto, with a mixture comprising an oxygen-containing mercuric salt and an aqueous solution of an oxygen-containing acid having an acid strength corresponding to that of an aqueous solution of sulfuric acid having a sulfuric acid concentration of 0.5% to 5%.

10. A process for the production of an aliphatic monoketone which comprises maintaining an aqueous acidic mixture of a mercuric salt at a temperature in the range of 40° C. to 70° C., adding an open-chain olefin having more than three carbon atoms and containing only one unsaturated linkage consisting of a double bond between two carbon atoms each having at least one hydrogen atom directly attached thereto, to said aqueous mercury salt solution in an amount nisufficient to combine with all of the mercury salt, then raising the temperature of reaction to about 100° C. and recovering an aliphatic ketone from the reaction mixture.

11. A process for the production of an aliphatic monoketone which comprises reacting an open-chain olefin having more than three carbon atoms and containing only one unsaturated linkage consisting of a double bond between two carbon atoms each having at least one hydrogen atom directly attached thereto, with an aqueous acidic mixture of a mercury salt in such proportion that the mercury salt is present in an amount corresponding to a 25% to 50% excess over the amount theoretically required to react with all of the olefin.

12. A process for the production of propyl vinyl ketone which comprises reacting hexene-1 at a temperature of between about 50° C. and about 60° C. with a quantity of mercuric sulfate in an aqueous acid medium containing from about 0.5% to about 5.0% of sulfuric acid, thereby forming a hexene-1-mercuric sulfate addition product, and subsequently heating the said addition product in the said acid solution to a temperature of about 100° C. to decompose the said addition product and form the desired propyl vinyl ketone.

HARRY LOUIS YALE.
GEORGE W. HEARNE.